United States Patent [19]
Zieger

[11] Patent Number: 6,073,882
[45] Date of Patent: *Jun. 13, 2000

[54] FLYING VEHICLE WITH RETRACTABLE WING ASSEMBLY

[76] Inventor: N. Henning Zieger, 925 S. Los Robles Ave., Pasadena, Calif. 91106

[*] Notice: This patent issued on a continued prosecution application filed under 37 CFR 1.53(d), and is subject to the twenty year patent term provisions of 35 U.S.C. 154(a)(2).

[21] Appl. No.: 09/158,354

[22] Filed: Sep. 21, 1998

[51] Int. Cl.[7] ........................................... B64C 3/56
[52] U.S. Cl. .................. 244/49; 244/2; 244/3.28; 244/124
[58] Field of Search ................ 244/2, 3.28, 49, 244/124, 35 R, 123, 46

[56] References Cited

U.S. PATENT DOCUMENTS

| | | | |
|---|---|---|---|
| 1,427,257 | 8/1922 | Bowen et al. | 249/49 |
| 1,485,163 | 2/1924 | Braun | 244/49 |
| 1,545,553 | 7/1925 | Dillingham | 244/49 |
| 1,615,682 | 1/1927 | Clark | 244/23 B |
| 1,762,657 | 6/1930 | Francesconi et al. | 249/49 |
| 1,762,874 | 6/1930 | McLind | 244/49 |
| 2,810,985 | 10/1957 | Bilder | 244/49 |
| 4,090,684 | 5/1978 | Look | 244/218 |
| 4,106,727 | 8/1978 | Ortell | 244/49 |
| 4,269,374 | 5/1981 | Miller | 244/2 |
| 4,579,297 | 4/1986 | Ayoola | 244/49 |
| 4,635,881 | 1/1987 | Brieseck | 244/49 |
| 4,869,441 | 9/1989 | Steuer | 244/3.28 |
| 5,039,030 | 8/1991 | Kraus | 244/3.28 |
| 5,137,229 | 8/1992 | Kraus | 224/49 |
| 5,312,070 | 5/1994 | Arena | 244/46 |

OTHER PUBLICATIONS

PCT Search Report for PCT/US99/21941.

*Primary Examiner*—J. Woodrow Eldred
*Attorney, Agent, or Firm*—Henricks, Slavin & Holmes LLP

[57] ABSTRACT

A retractable wing assembly for a flying vehicle includes a vane support member, a wing with vanes, and a wing extending and retracting assembly. Each vane includes a base portion and an end portion and is pivotally secured to the vane support member at its base portion. The wing extending and retracting assembly includes link members and an articulating assembly. Each link member pivotally connects two of the vanes together between the base portions and end portions of the two vanes. The articulating assembly is secured to a vehicle body and mechanically coupled to the vane support member and at least one of the vanes. The articulating assembly is manipulable to reposition the vane support member relative to the vehicle body while simultaneously spreading the end portions of the vanes apart from each other.

21 Claims, 12 Drawing Sheets

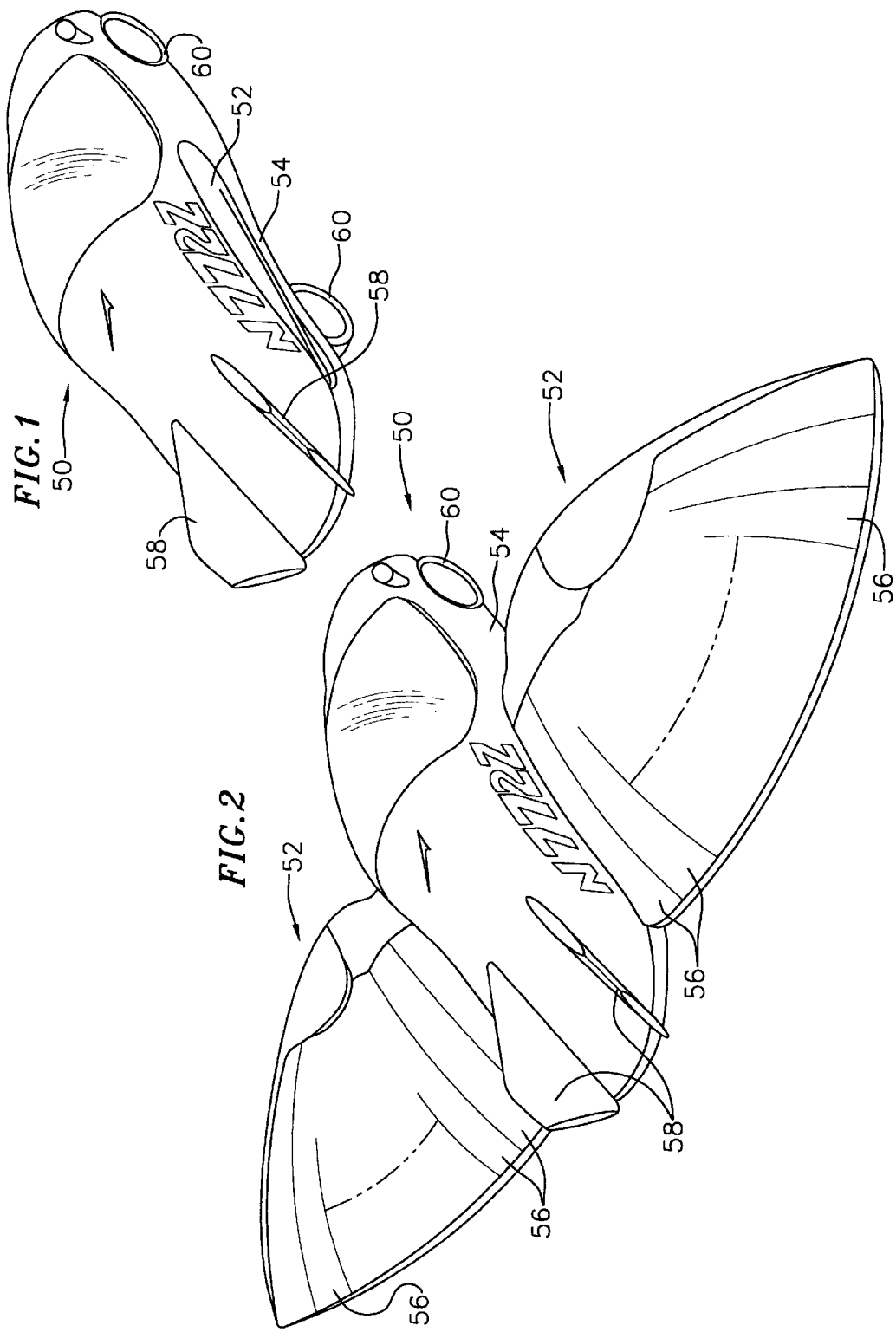

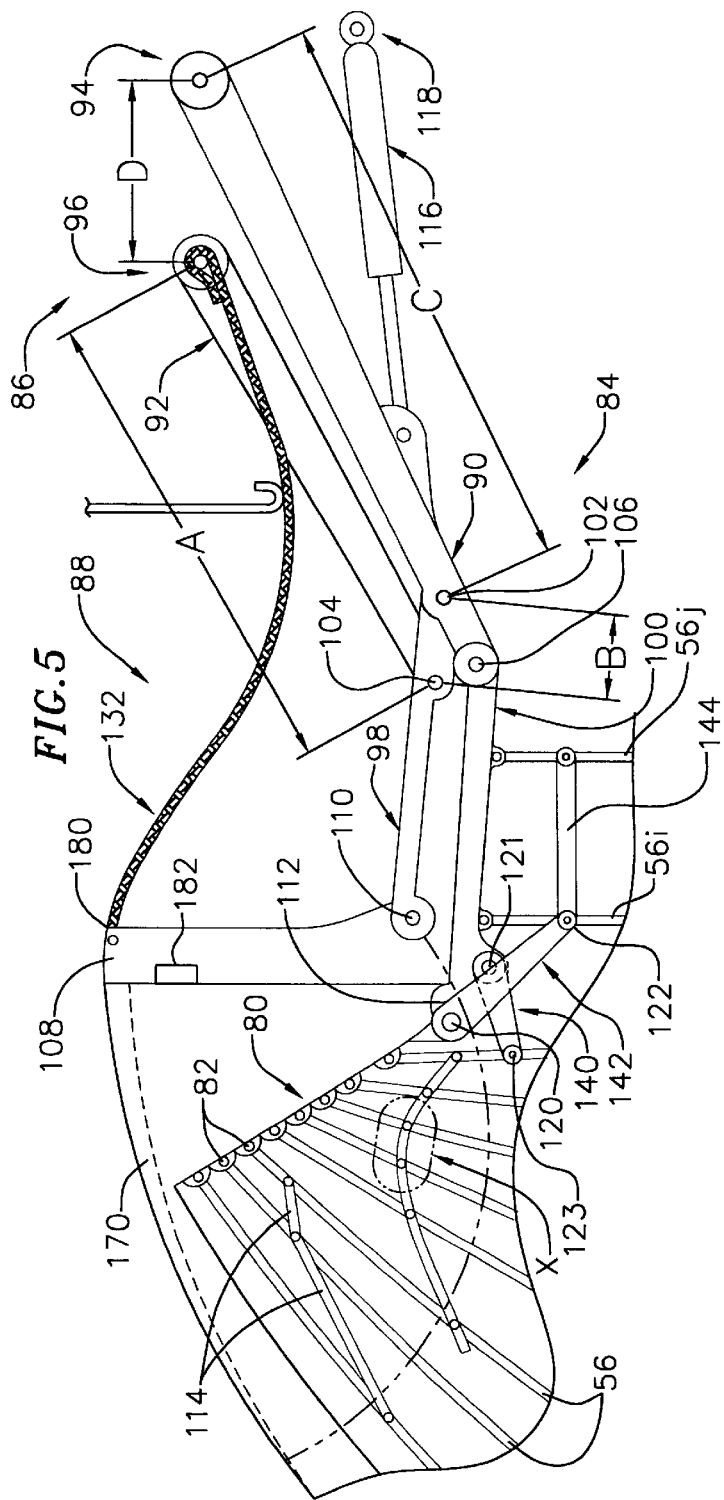
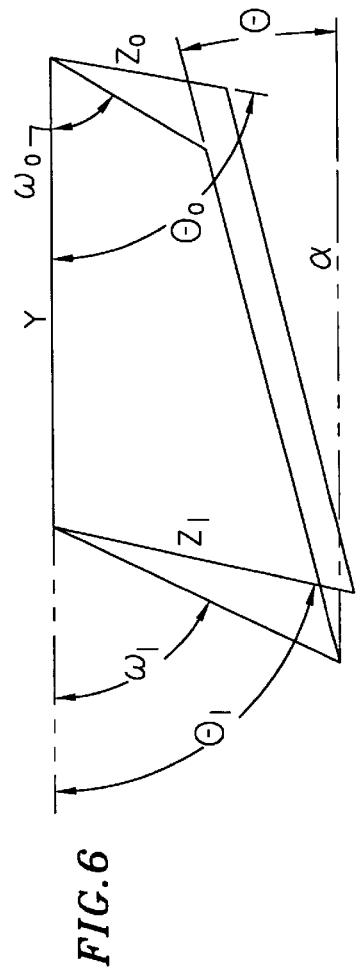
FIG.5
FIG.6

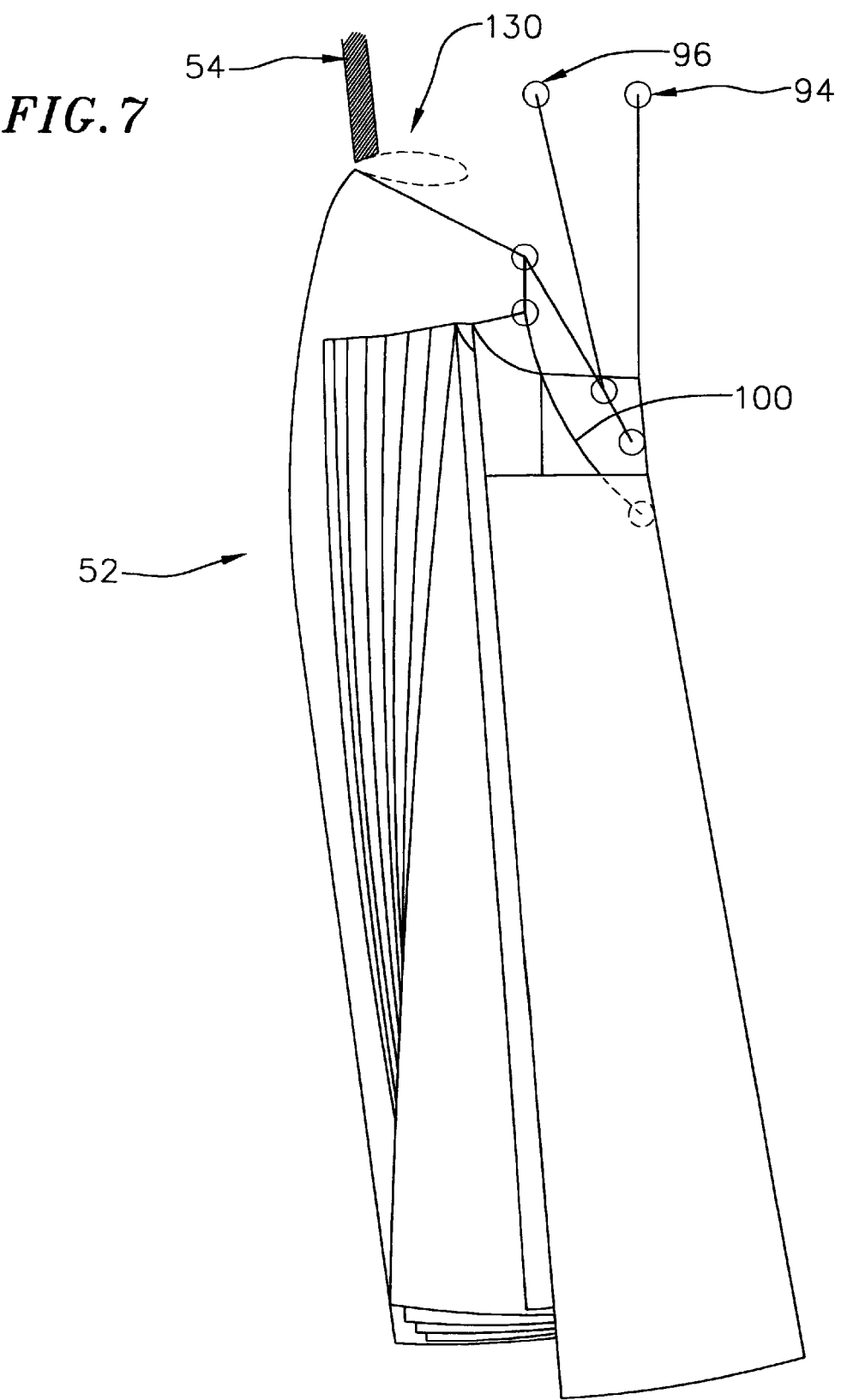

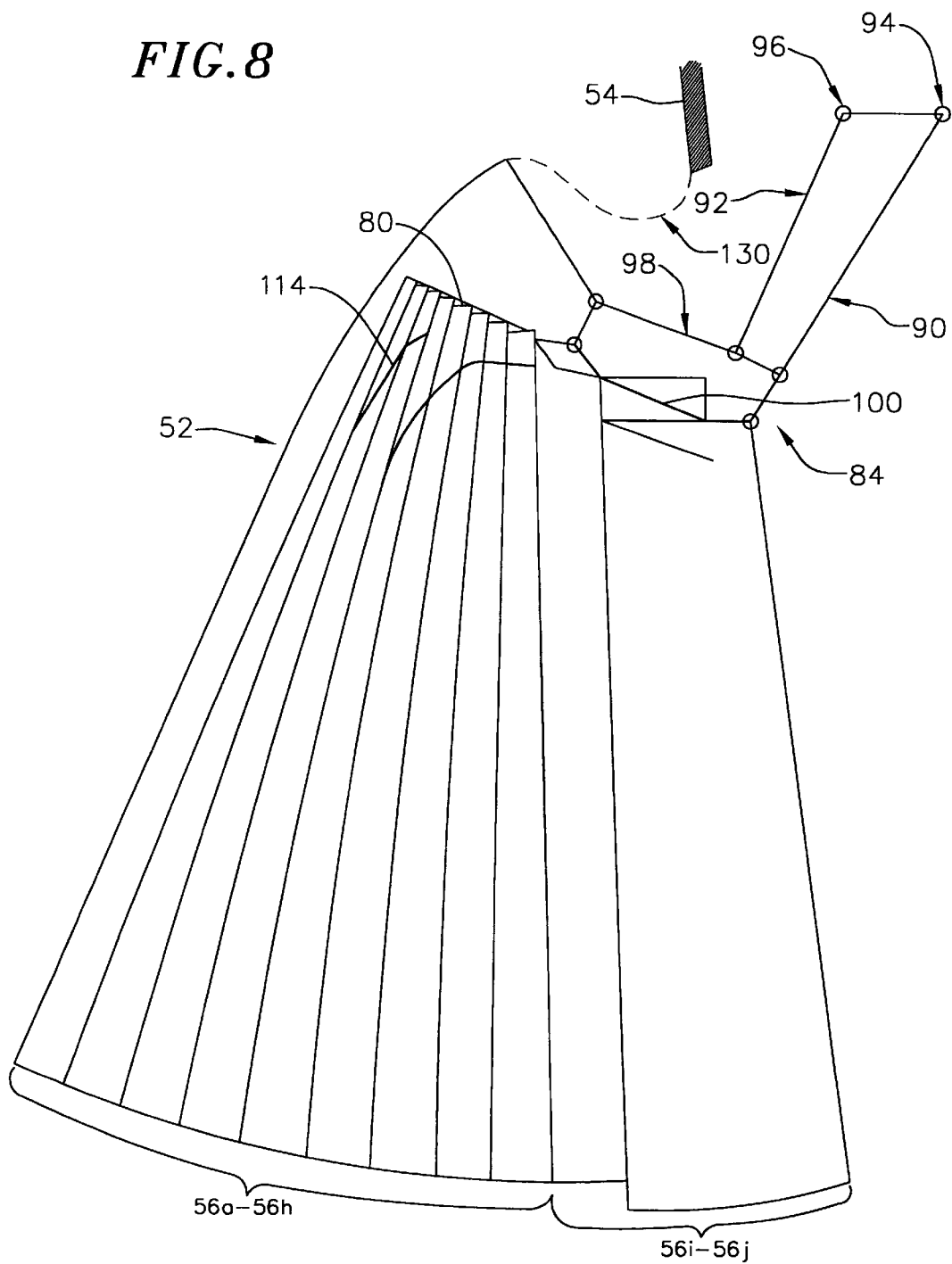

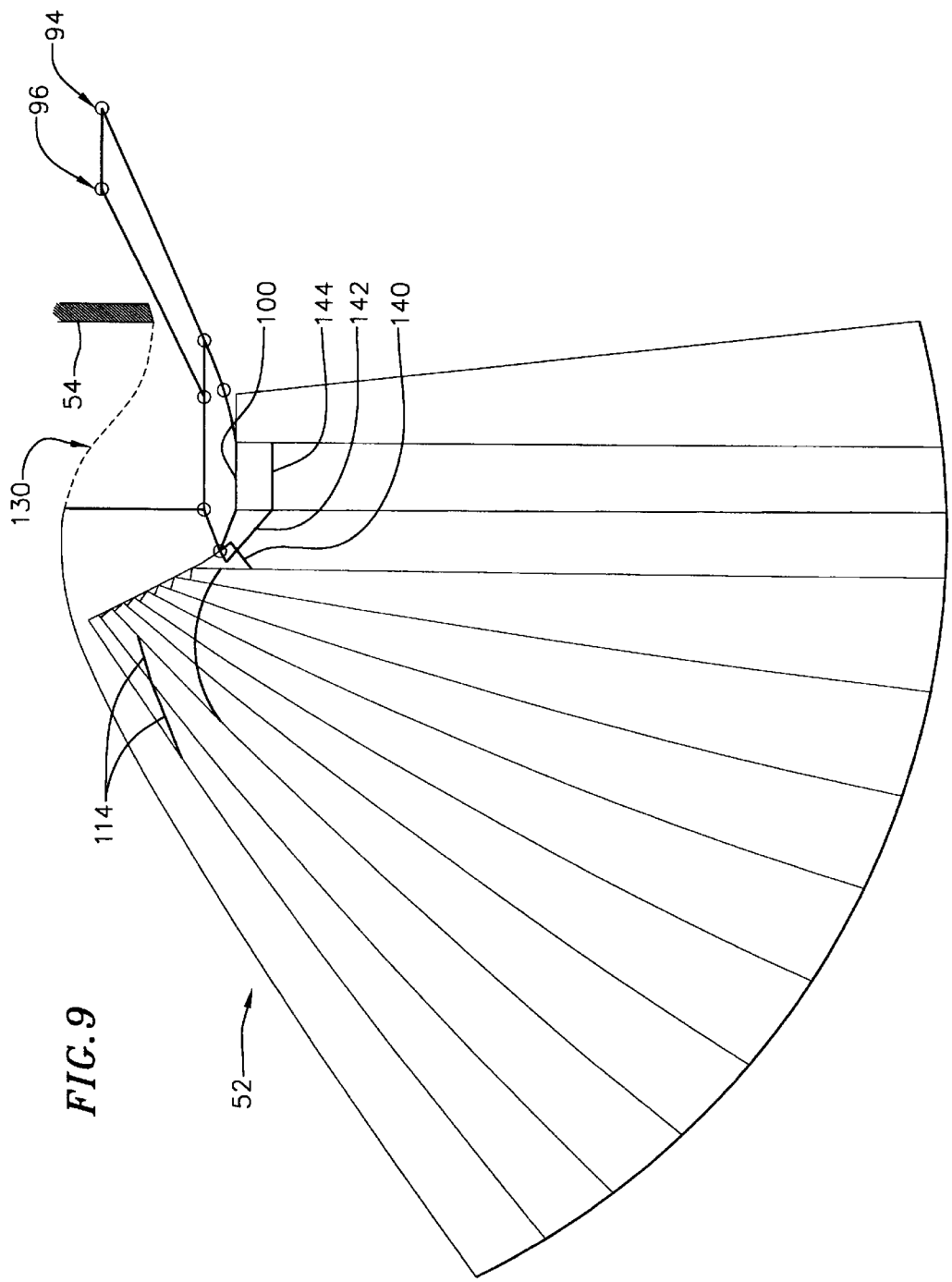

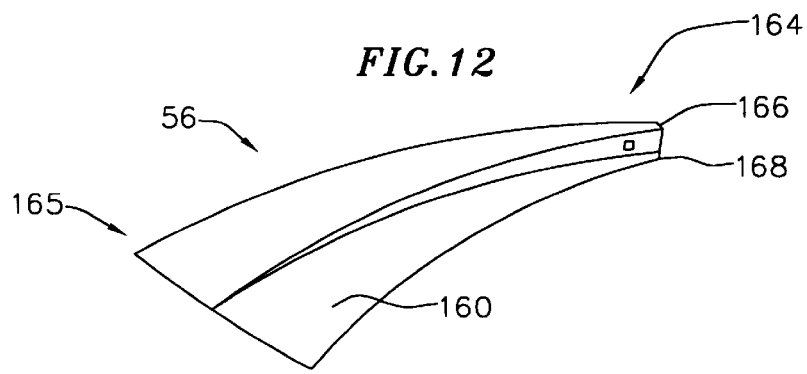
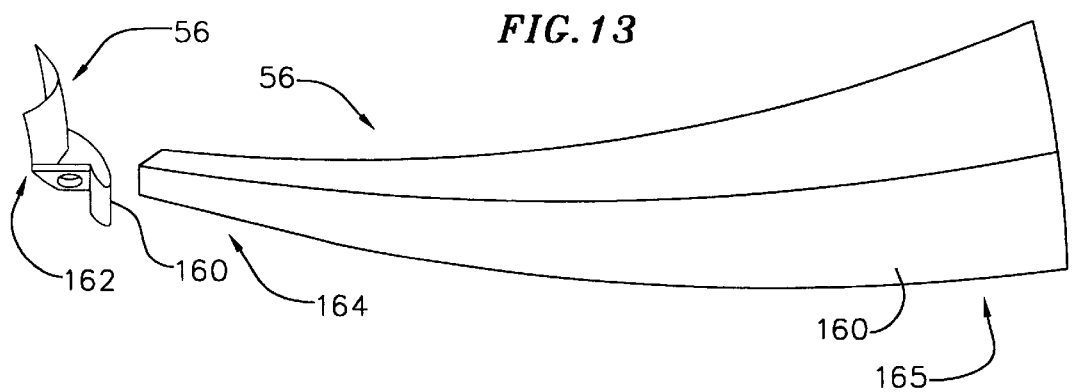
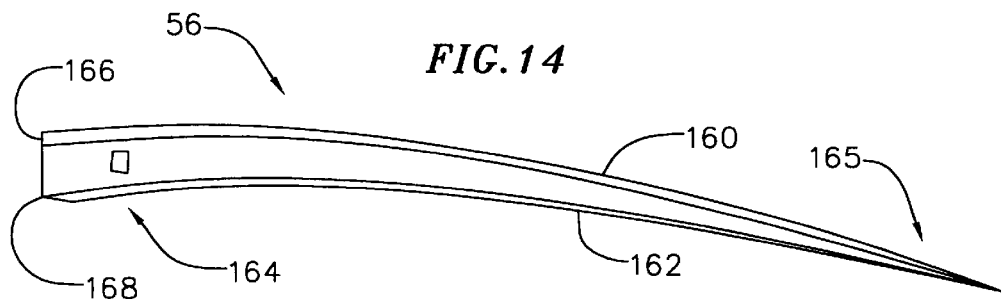

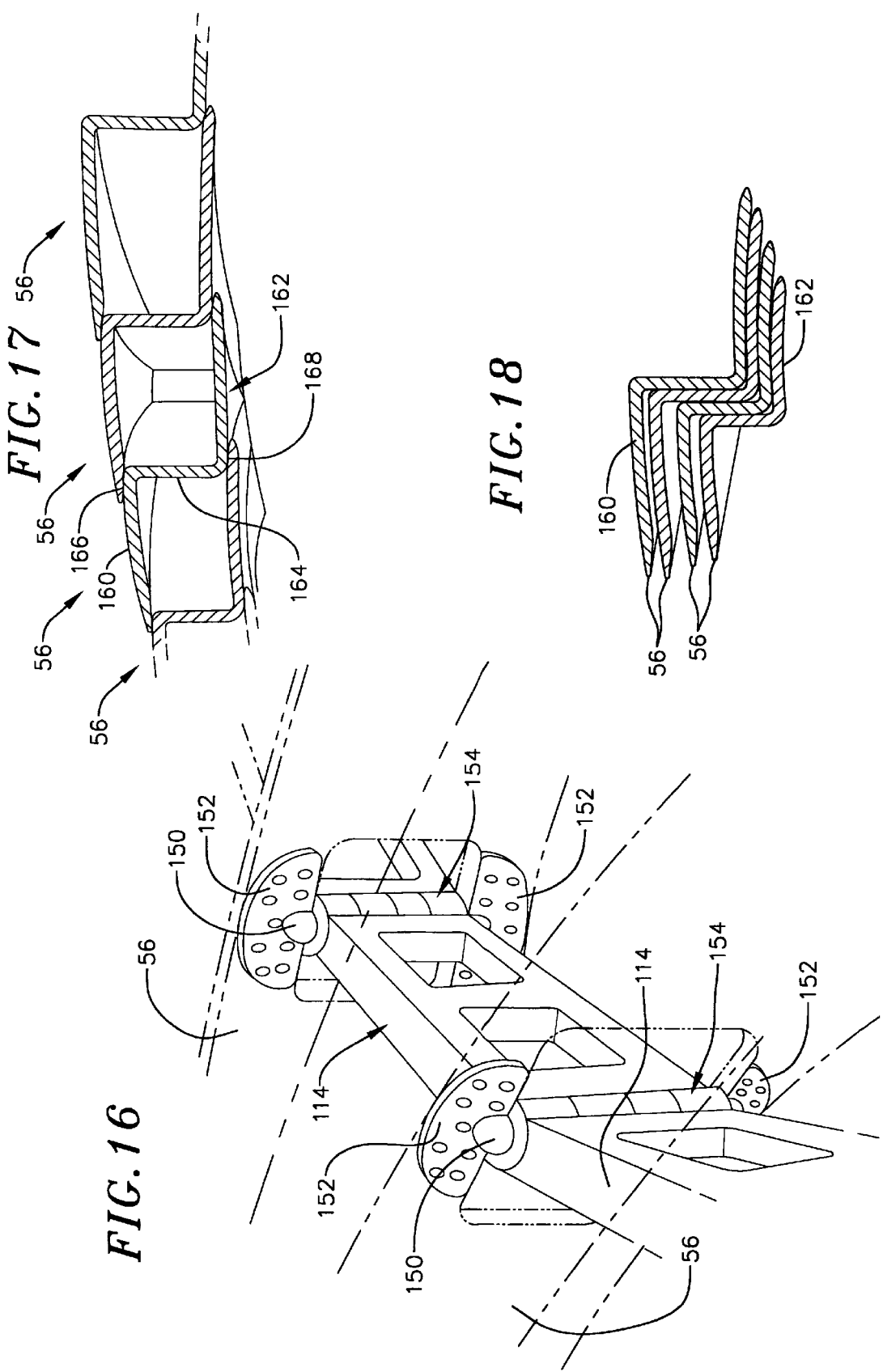

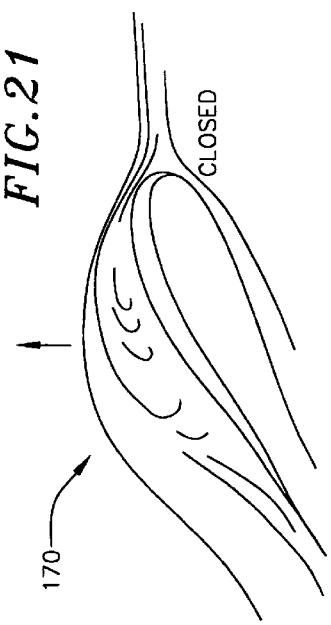
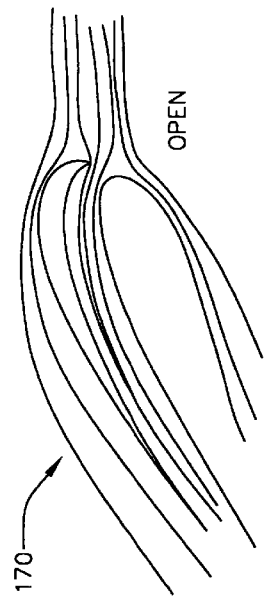
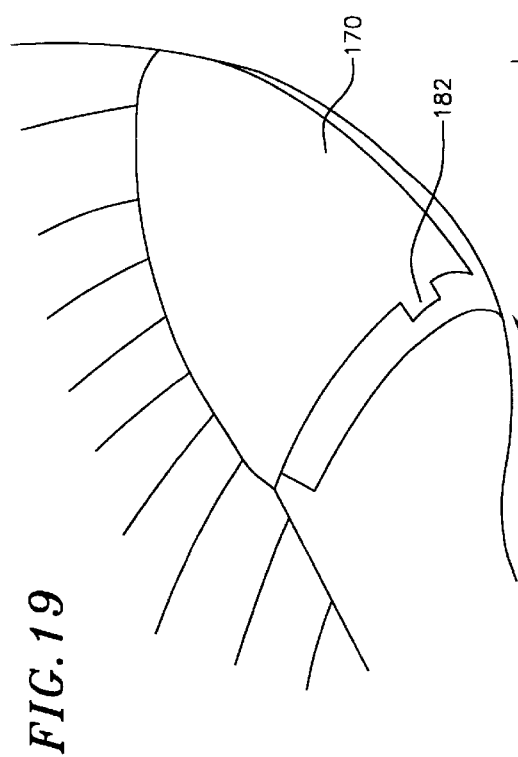
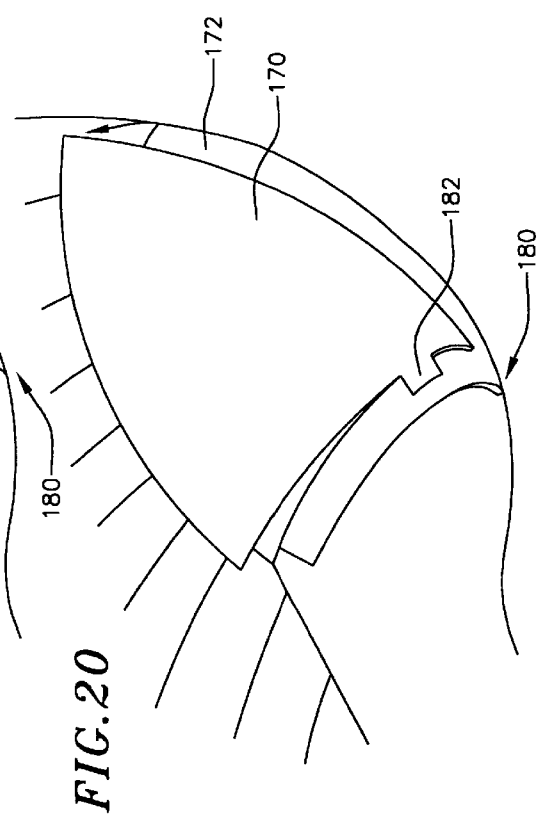

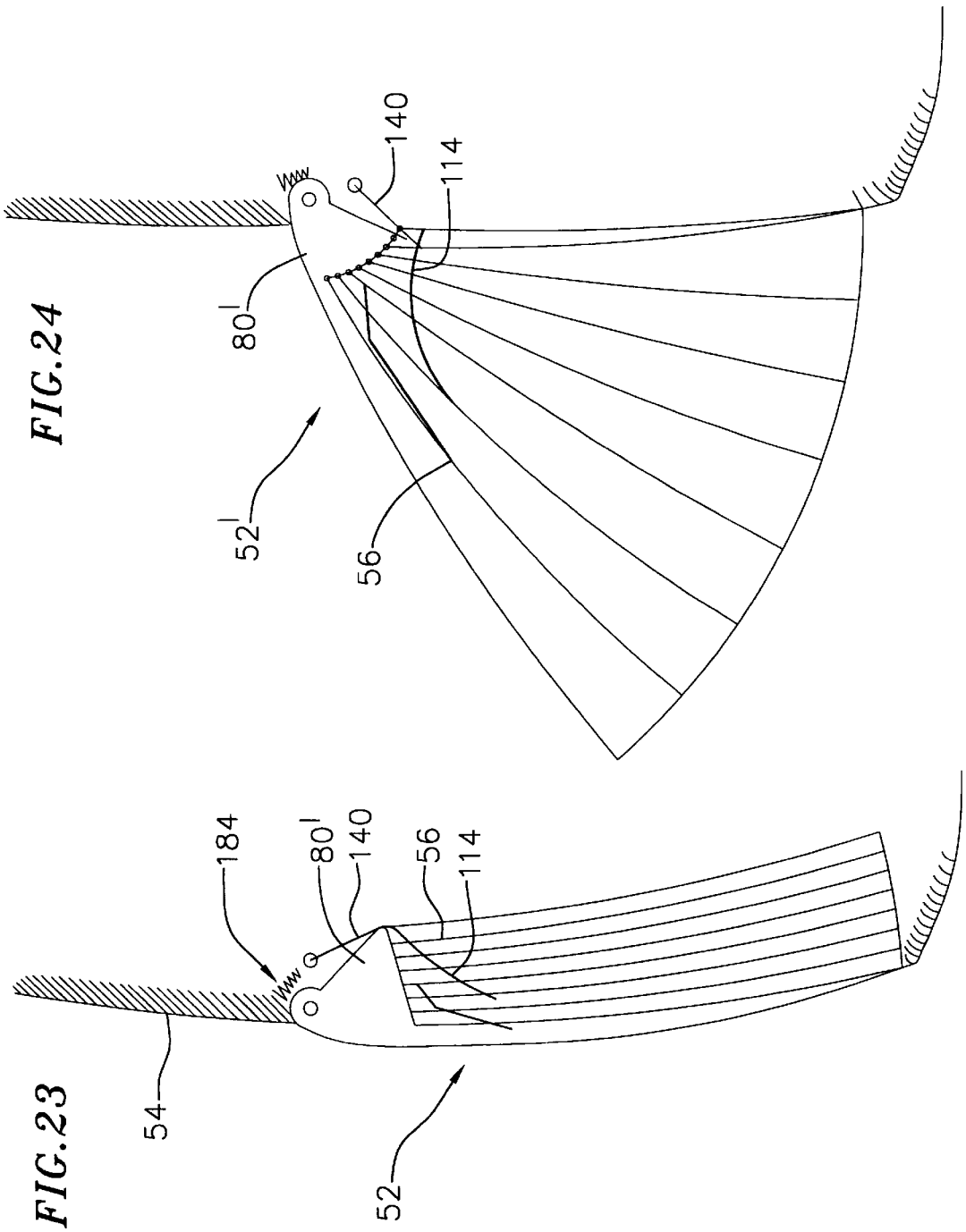

6,073,882

FLYING VEHICLE WITH RETRACTABLE WING ASSEMBLY

BACKGROUND OF THE INVENTIONS

1. Field of the Inventions

The present inventions relate to a flying vehicle with a retractable wing assembly and, more particularly, pertain to a flying vehicle with a retractable wing assembly that includes an articulating support mechanism.

2. Description of the Related Art

Travelers and long distance commuters have traditionally been forced to drive to an airport in order to switch from a ground vehicle to an airplane, helicopter or the like. Upon arrival at their destinations, they must switch back to another ground vehicle such as a rented car or taxi. These realities and limitations of modern transportation systems result in a tremendous amount of wasted money and time because travelers and commuters are forced to repeatedly switch back and forth between ground vehicles and air-going vehicles.

In this time of ever-increasing road traffic and with people often preferring to live outside of urban centers, a single vehicle capable of changing "on-the-go" from a terra mode to a flying mode would be highly desirable. Although a combined road vehicle and aircraft is known, see U.S. Pat. No. 4,269,374 to Miller, the art is devoid of a vehicle capable of changing from a land to air to land transport mechanism without having to stop the vehicle. Furthermore, no vehicle is known that has a wing assembly designed to be easily extended or retracted, on-the-go, without employing cumbersome latches or mechanisms for pivoting the wing assembly upward away from or downward toward the body of the vehicle.

OBJECTS AND SUMMARY OF THE INVENTIONS

Thus, it is an object of the present inventions to provide a flying vehicle with a retractable wing assembly, which addresses the deficiencies of the prior art discussed above.

A key feature of a flying vehicle in accordance with at least one of the present inventions is that it has a small cross section when the wings are retracted allowing it to travel on most any road in the world, thus providing a unique blend of aircraft and surface transport. The retractable wing assembly is articulating and is complemented by a vane or fin arrangement which creates a broad wing when open, but a compact bundle when closed. This is preferably achieved with a zig-zag vane pattern which allows the vanes to nest closely together when the wing is closed, but overlap one another when open creating a light, hollow space. Also unique to this design is an articulating slot at the leading edge of the wing, which opens automatically when the wing is in a high angle of attack.

In accordance with a specific illustrative embodiment of a present invention, a flying vehicle with a retractable wing assembly includes a vehicle body and at least one retractable wing assembly attached to the vehicle body. The wing assembly includes a vane support member, vanes pivotally secured to the vane support member, link members interconnecting the vanes, and an articulating assembly secured to the vehicle body and mechanically coupled to the vane support member and at least one of the vanes. The articulating assembly is manipulable to reposition the vane support member relative to the vehicle body and to spread the vanes apart from each other.

In another present invention, a retractable wing assembly for a flying vehicle includes a vane support member, a wing, and a wing extending and retracting assembly. The wing has vanes which each include a base portion and an end portion. The vanes are pivotally secured to the vane support member at their base portions. The wing extending and retracting assembly includes link members and an articulating assembly. The link members each pivotally connect two of the vanes between the base portions and the end portions of the vanes. The articulating assembly is secured to a vehicle body and mechanically coupled to the vane support member and at least one of the vanes. The articulating assembly is manipulable to reposition the vane support member relative to the vehicle body while simultaneously spreading the end portions of the vanes apart from each other. Additionally, the vanes may be secured to the vane support structure, and the link members may be sized and connected to the vanes such that the wing can be extended or retracted without having to adjust the link members.

In another present invention, a retractable fin support assembly for a flying vehicle includes a fin support member and a retractable assembly mechanically coupling the fin support member to a vehicle body. The fin support member includes mechanical couplings for pivotally attaching mechanically interconnected fins to the fin support member. The retractable assembly is manipulable to translate and rotate the fin support member in relation to the vehicle body between a retracted position and an extended position. The retractable assembly may also include an inner portion and an outer portion which are articulately interconnected. Additionally, or alternatively, the retractable assembly may include a fin expanding member which is attached to at least one of the fins and pivotally attached to the outer portion.

In another present invention, a vehicle includes a vehicle body and a retractable wing assembly associated with the vehicle body and including: a first member having a first portion and a second portion in spaced relation to the first portion, the first portion being pivotably connected to the vehicle body such that the second portion is movable from a retracted position adjacent to the vehicle body to an extended portion in spaced relation to the vehicle body; a second member having a first portion and a second portion in spaced relation to the first portion, the first portion of the second member being pivotably connected to the second portion of the first member such that the second portion of the second member is movable from a retracted position adjacent to the first portion of the first member to an extended portion in spaced relation to the first portion of the first member; and a third member having a first portion and a second portion in spaced relation to the first portion, the first portion of the third member being operably connected to the second-portion of the second member such that the second portion of the third member is movable from a retracted position adjacent to the first portion of the second member to an extended portion in spaced relation to the first portion of the second member.

In accordance with another aspect of at least one of the present inventions, a flying vehicle with a retractable wing assembly may be either a motorized vehicle or a non-motorized vehicle.

In accordance with another aspect of at least one of the present inventions, a flying vehicle with a retractable wing assembly includes a landing gear and wheel arrangement that extends below normal driving height during landing to provide additional stability.

In accordance with another aspect of at least one of the present inventions, a flying vehicle with a retractable wing assembly includes a steering mechanism which provides yaw control for the vehicle by simply twisting the steering wheel while the foot pedals remain normal to automobiles, thus keeping the foot pedals simple.

In accordance with another aspect of at least one of the present inventions, a flying vehicle with a retractable wing assembly includes a wind break provided through a downward rotation of the wing (pitch up) and a trailing-edge-outward-rotation of a V tail (pitch down), or elevator in a T-tail configuration.

In accordance with another aspect of at least one of the present inventions, the retractable wing assembly includes a flap which operates through a low pressure mechanism to less the tendency to stall in slow flight and at a high angle of attack.

DESCRIPTION OF THE DRAWINGS

Other objects, features and advantages of the inventions will become readily apparent upon reference to the following detailed description when considered in conjunction with the accompanying drawings, in which like reference numerals designate like parts throughout the figures thereof, and wherein:

FIG. 1 is a perspective view of an exemplary preferred embodiment of a flying vehicle according to a present invention including a retractable wing assembly shown in its retracted position;

FIG. 2 is a perspective view of the flying vehicle of FIG. 1 with the retractable wing assembly shown in its extended position;

FIG. 5 is a partial top view of an exemplary preferred embodiment of a retractable wing assembly according to a present invention;

FIG. 6 conceptually illustrates the four-sided geometry utilized by the articulating mechanisms of the retractable wing assembly of FIG. 5;

FIG. 7 is a simplified cross-sectional top view of the retractable wing assembly of FIG. 5 shown in a retracted position;

FIG. 8 is a simplified cross-sectional top view of the retractable wing assembly of FIG. 5 shown in a partially-extended position;

FIG. 9 is simplified cross-sectional top view of the retractable wing assembly of FIG. 5 shown in a fully-extended position;

FIG. 12 is an isometric view of an exemplary preferred vane of the wing assembly of FIG. 5;

FIGS. 13, 14 and 15 respectively show top, side and front views of the exemplary preferred vane of FIG. 12;

FIG. 16 is a perspective view of exemplary preferred link members interconnecting vanes of the retractable wing assembly within the dashed outline denoted "X" of FIG. 5;

FIG. 17 is a cross-sectional, partial rear view of the vanes of the wing assembly of FIG. 5 when the wing assembly is in its extended position;

FIG. 18 is a cross-sectional, partial rear view of the vanes of the wing assembly of FIG. 5 when the wing assembly is in its retracted position;

FIGS. 19 and 20 are perspective views showing a flap on the exterior of the retractable wing assembly of FIG. 5 when the flap is closed and open, respectively;

FIGS. 21 and 22 are cross-sectional side views showing the flap on the exterior of the retractable wing assembly of FIG. 5 when the flap is closed and open, respectively;

FIG. 23 is a simplified cross-sectional top view of another retractable wing assembly in a retracted position;

FIG. 24 is a simplified cross-sectional top view of the retractable wing assembly of FIG. 23 shown in an extended position.

DETAILED DESCRIPTION OF THE PREFERRED EMBODIMENTS

Figure 3:
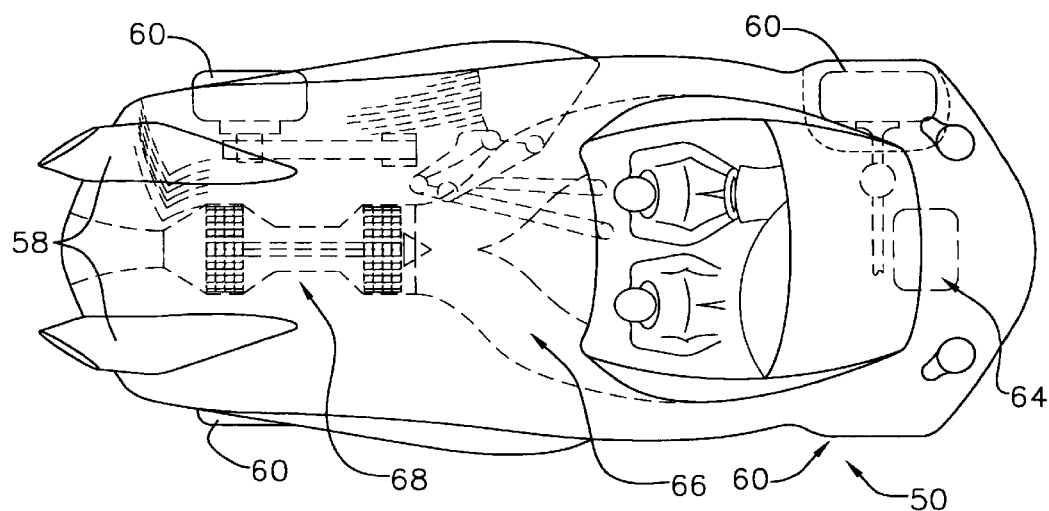
FIG. 3 is a partial, cross-sectional top view of the flying vehicle of FIG. 1.

The following is a detailed description of the best presently known modes of carrying out the inventions. This description is not to be taken in a limiting sense, but is made merely for the purpose of illustrating the general principles of the inventions.

Referring to FIG. 1, an exemplary preferred embodiment of a flying vehicle 50 according to a present invention is shown in a ground vehicle or land transport mode. The flying vehicle 50 includes two wing assemblies 52, only one of which is visible in FIG. 1. In this mode of operation, the wing assemblies 52 are retracted and fit within slots, recesses, or the like formed in the sides 54 of the flying vehicle 50.

The body and wing of the flying vehicle 50 is formed from steel, aluminum, fiberglass, plastic, or a combination of such materials and, preferably, is shaped in an airfoil fashion to take advantage of additional lifting forces when operated in the air-going or flying mode shown in FIG. 2. In this mode of operation, the wing assemblies 52 are fully extended from the sides 54.

Generally, the retractable wing assemblies 52 each include a plurality of vanes 56 (also referred to as fins 56) and a mechanism for moving the vanes 56 back and forth between a retracted position and an extended position. In addition to the wing assemblies 52, the flying vehicle 50 includes a tail arrangement 58 such as the two-piece configuration shown in FIG. 2. The tail arrangement 58 augments the pitch and yaw control effected by the wings. It should be understood, however, that the tail arrangement 58 can alternately comprise a V or T formation, a vertical formation such as that of the Concorde, or other formations. The vertical tail adds yaw stability and is configured to rotate slightly on command to adjust the turn angle to optimum.

Exemplary preferred overall closed body dimensions (with wings retracted) are 15 feet long by 5.5 feet wide by 4 feet tall, with an open wingspan of 23 feet, a wing area of 80 square feet and a major chord of 8 feet. It should be understood, however, that these dimensions are merely exemplary and that they can be adjusted to accommodate different vehicle bodies or performance requirements.

Figure 4:
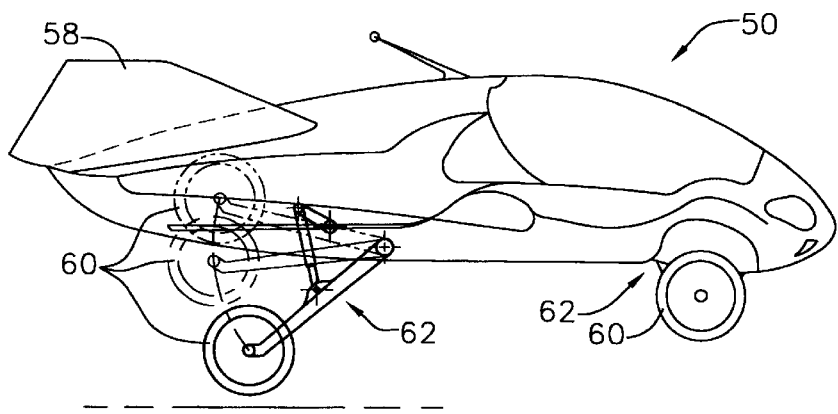
FIG. 4 is a cross-sectional side view of the flying vehicle of FIG. 1.

Referring to FIG. 3, an exemplary preferred embodiment of the flying vehicle 50 includes four wheels 60, two fore and two aft. Preferably, the wheels 60 are selected to be optimum for both landing and driving performance. As shown in FIG. 4, the flying vehicle 50 also includes landing gear arrangements 62 for both the front and rear wheels 60. While flying, the landing gear arrangements 62 for the rear wheels 60 are able to retract as shown because the wing assemblies 52 are extended. During a landing, the gear arrangements 62 are configured to extend below normal driving height to provide additional stability. However, it should be understood that the landing gear arrangements 62 do not necessarily have to be extendable as shown in FIG. 4, but rather can be supported with conventional shock absorbers, or the like.

With regard to propulsion, an exemplary preferred embodiment of the flying vehicle 50 also includes a motor 64, air duct 66, and turbine 68 configured as shown in FIG. 3. A mid-mounted internal combustion engine or jet engine/ electric motor hybrid can be used to achieve both ground and air locomotion. For surface transportation, the internal combustion engine or electric motor powers the wheels forward and reverse. When placed in flight mode (wings extended), either a second clutch is engaged which turns the ducted fan within the body or, in the case of the hybrid motor, the jet is used. The air is taken in through two inlets just aft of the cabin and is ducted through the body via air ducts 66 to the fan. The air is then expelled from the rear of the vehicle 50. An added benefit of the fan is to help get the vehicle out of mud, sand or snow.

The cabin of the flying vehicle 50 is similar to conventional automobile interiors in production today with instruments positioned in the dashboard. Optional features, including but not limited to the following features, can be included: GPS mapping of location and designation, HUD display which can be expanded to take advantage of ATC free flight efforts, charged parachutes for the entire vehicle deploy automatically in cases of extreme airborne distress, air conditioning, leather seats, air bags, ABS and other mass produced safety, performance or comfort features.

With regard to controls, steering on the ground is the same as in traditional automobiles. A key feature of the present invention is that the steering wheel also controls the ailerons of the wings when airborne. A particular difficulty comes in the yaw control of aircraft in the air. Traditionally, rudder pedals are used in airplanes; however, these would interfere with ground driving. To ameliorate this, the rudder control is achieved through a twisting of the steering wheel (the wheel twists left to right when viewed from above). Pitch control is conventional. The accelerator, brake and clutch pedal are normal to automobiles. The accelerator has a cruise-control feature that uses wheel rotation on the ground and air speed in the air when the wings are extended. The brake pedal depressed in the air results in the release of the accelerator pedal. With the tail arrangement 58 mentioned above, a windbreak is achieved through an upward rotation of the wing (pitch up), a trailing-edge-outward-rotation of the V tail or a downward rotation of the elevator in T-tail configuration (pitch down). The parking break is conventional.

FIG. 5 shows the exemplary retractable wing assembly 52 in greater detail. The retractable wing assembly 52 includes a fin support member 80 with a plurality of mechanical couplings 82 for pivotally attaching the fins 56 to the fin support member 80. By way of example but not of limitation, the mechanical couplings 82 comprise cylindrical shafts and complementary sleeves fitted thereabout. The retractable wing assembly 52 also includes an articulating, retractable arm assembly 84 which functions to mechanically couple the fin support member 80 to the body of the flying vehicle 50. Generally, the retractable arm assembly 84 is manipulable to translate and rotate the fin support member 80 in relation to the vehicle body between the retracted position shown in FIG. 1 and the extended position shown in FIG. 2.

Referring again to FIG. 5, the exemplary retractable wing assembly 52 comprises an inner portion 86 and an outer portion 88 that are articulately interconnected as shown. The inner portion 86 includes a drive arm member 90 and an extension arm member 92 which are pivotally attached to the vehicle body at pivot points 94, 96, respectively. The outer portion 88 includes a forward arm member 98 and rearward arm member 100 which are pivotally connected to the drive arm member 90 and the extension arm member 92 as shown. More specifically, the forward arm member 98 is pivotally attached to the drive arm member 90 and to the extension arm member 92 at pivot points 102, 104, respectively. The rearward arm member 100, in turn, is pivotally attached to the drive arm member 90 at pivot point 106.

The retractable arm assembly 84 also includes a fin expanding member 108 which is attached to at least one of the fins 56 via linking member 142 and pivotally attached to the outer portion 88. Preferably, the fin expanding member 108 is pivotally attached to the forward arm member 98 and the rearward arm member 100 at pivot points 110, 112, respectively, and also attached to an outermost fin 56 of a plurality of mechanically interconnected fins 56.

The fin expanding member 108 is attached to the outermost secondary 56i via linking member 142. As the fin expanding member rotates outward, the linking member 142 pulls the outermost secondary 56i into position. This in turn pulls the other secondary 56j into position via linking member 144.

In addition, the rearward arm member 100 is pivotally attached to the innermost primary 56a via linking member 140. As the arm rotates outward, it pushes the innermost primary 56a into position. This in turn pushes the other primaries 56b–56h into position via linking members 114.

Referring to FIG. 5, the exemplary retractable wing assembly 52 includes a plurality of link members 114 that pivotally interconnect the vanes 56. The articulating assembly 84 is secured to the vehicle body and mechanically coupled to the vane support member 80 and at least one of the vanes 56. Interconnected as such, the articulating assembly 84 is manipulable via a force applied to a portion of the articulating assembly 84 to reposition the vane support member 80 relative to the vehicle body and to spread the vanes 56 apart from each other. The retractable wing assembly 52 includes an actuator 116 mechanically connected between the vehicle body (at pivot point 118) and a portion of the articulating assembly 84. In the illustrated preferred embodiment illustrated in FIG. 5, this portion of the articulating assembly 84 is the drive arm member 90, and the actuator 116 comprises a hydraulic piston.

The fin support member 80 discussed supra is pivotally attached to the linking member 142 at pivot point 120. The link member 142 is pivotally attached to the outermost secondary 56i at pivot point 122. The rearward arm member 100 is pivotally attached to the linking member 140 at pivot point 121. The linking member 140 is pivotally attached to the innermost primary 56a at pivot point 123. This pivotal attachment, in conjunction with the articulating motion of the assembly 84 and the mechanical interconnection of the fins 56, results in the articulating assembly 84 being manipulable to reposition the vane support member 80 relative to the vehicle body while simultaneously spreading end portions of the vanes 56 apart from each other.

FIG. 6 conceptually illustrates the four-sided geometry utilized by the articulating mechanisms of the retractable wing assembly 52. The following equation governs the basic angular relationships illustrated in FIG. 6:

$$(z1 \cdot \cos(\theta 1) - z0 \cdot \cos(\theta 0) + y)^2 + (z1 \cdot \sin(\theta 1) - z0 \cdot \sin(\theta 0))^2 = (z1 \cdot \cos(\omega 1) - z0 \cdot \cos(\omega 0) + y)^2 + (z1 \cdot \sin(\omega 1) - z0 \cdot \sin(\omega 0))^2$$

where, in the case of calculating dimensions of the vanes:

z0=length along first vane from base to point where its link member is attached;

z1=length along second vane from base to point where its link member is attached;

θ0=angle of first vane from base y in closed position;

θ1=angle of second vane from base y in closed position;

ω0=angle of first vane from base y in open position;

ω1=angle of second vane from base y in open position; and y=length along base from first vane to second vane.

The above equation is used to calculate the angles and distances in the articulating assembly 84, the linking members 140 and 142 to the vane support member 80 and the rearward arm member 100, and the interconnections of the vanes.

With regard to the link members 114, $$\alpha = \sqrt{(z1 \cdot \cos(\theta 1) - z0 \cdot \cos(\theta 0) + y)^2 + (z1 \cdot \sin(\theta 1) - z0 \cdot \sin(\theta 0))^2}$$

where α is the length of the link member 114.

Furthermore, the angle of the linking members 114 should not exceed 85 degrees. Beyond this boundary, the linking members would be put under too much stress to properly move the vanes.

Referring again to FIG. 5, extension of the drive arm member 90 away from the vehicle body automatically opens the "elbow" region where the inner portion 86 and the outer portion 88 of the retractable assembly 84 are joined through a four-sided geometry with variable corner angles. This geometry is defined by sides A, B, C and D. Side A is the length of rigid material along the extension arm member 92 between pivot points 96, 104. Side B is the section of the forward arm member 98 between pivot points 102, 104. Side C is the section of the drive arm member 90 between pivot points 94, 102. Side D is the straight line between pivot points 94, 96 on the vehicle body. The articulating assembly 84 swings outward because:

$$A+D>B+C.$$

The outer portion 88, in turn, forms a parallelogram. More specifically, the forward arm member 98, rearward arm member 100, fin expanding member 108, and the portion of the drive arm member 90 between pivot points 102, 106 form a parallelogram. Thus, the inner and outer portions 86, 88 of the assembly 84 extend and retract the plurality of vanes 56 through the articulating mechanical interconnection between the four-sided geometry with variable corners of the inner portion 86 and the parallelogram configuration of the outer portion 88.

FIG. 7 is a simplified cross-sectional top view of the retractable wing assembly 52 shown in a retracted position. FIG. 8 is a simplified cross-sectional top view of the retractable wing assembly 52 shown in a partially-extended position. FIG. 9 is a simplified cross-sectional top view of the retractable wing assembly 52 shown in a fully-extended position.

Referring to FIGS. 7, 8 and 9, the flying vehicle 50 also includes an elastic membrane or skin 130 shown as a dashed line between the side 54 of the vehicle body (or fuselage boundary) and the retractable wing assembly 52. A cable 132 (FIG. 5) pulls the skin 130 into shape upon extension defining a leading edge of the wing assembly 52. Preferably, the leading edge of comprised of Kevlar from DuPont.

The vanes 56 are preferably secured to the vane support structure 80 and the link members 114 are sized and connected to the vanes 56 such that the wing can be extended or retracted without having to adjust the link members 114, i.e., without having to adjust the positions of the link members 114 on the vanes 56 in order to transition from the retracted position to the extended position or vice versa.

Figure 11:
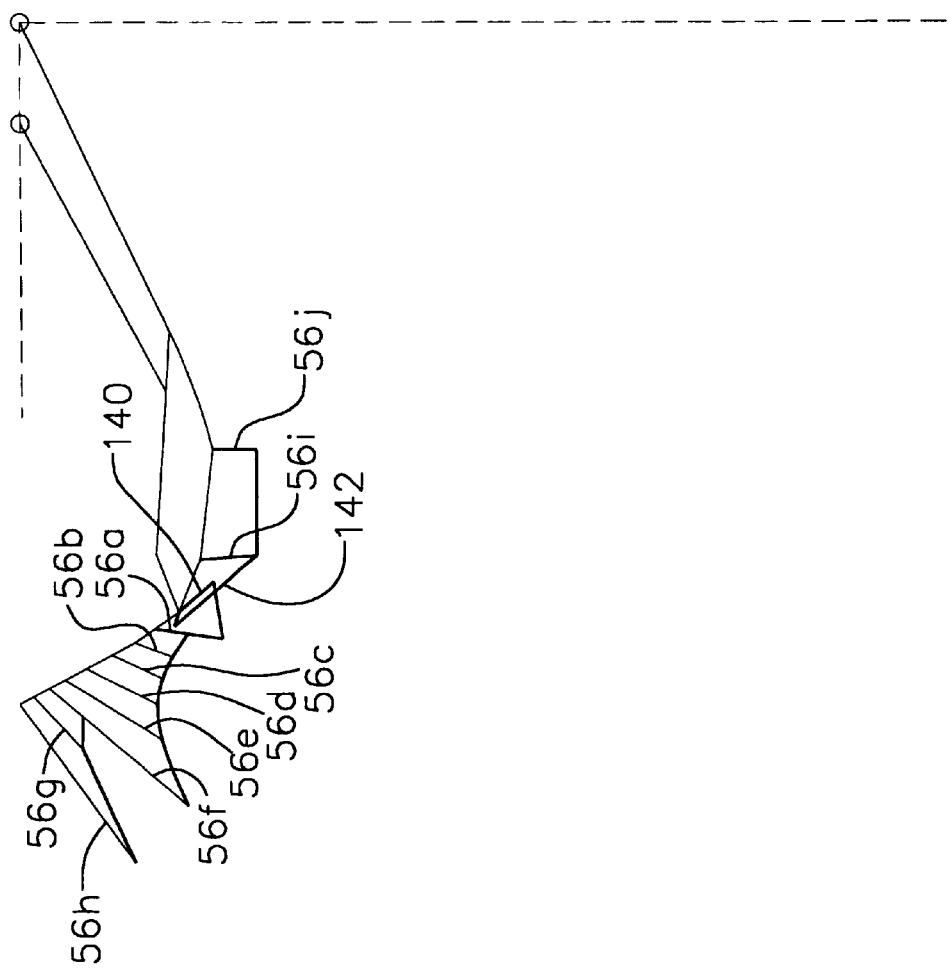
FIG. 11 is a cross-sectional, partial top view of the retractable wing assembly of FIG. 5 in a fully-extended position, the view particularly illustrates the link members that interconnect the vanes.
Figure 10:
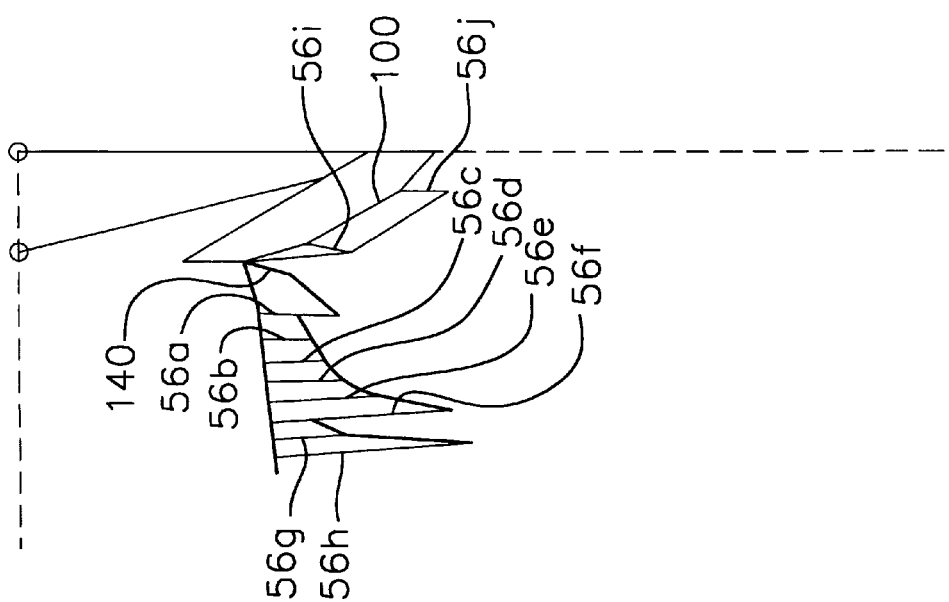
FIG. 10 is a cross-sectional, partial top view of the retractable wing assembly of FIG. 5 in a retracted position, the view particularly illustrates the link members that interconnect the vanes.

Referring to FIGS. 8, 10 and 11, the link members 114 are shown in bold lines to illustrate an important relationship between the link members 114 and the vanes 56, namely, that the link members 114 are attached to the vanes 56 at a distance along any particular vane 56 from the vane support member 80 which is determined as discussed supra.

The following equation is employed to maintain the center of lift as far forward as possible:

$$\frac{H \cdot \sin(h0) + R \cdot \sin(r0) + Tip \cdot \sin(tip0) - (H \cdot \sin(h1) + R \cdot \sin(r1) + Tip \cdot \sin(tip1))}{(H \cdot \cos(h1) + R \cdot \cos(r1) + Tip \cdot \cos(tip1)) - (H \cdot \cos(h0) + R \cdot \cos(r0) + Tip \cdot \cos(tip0))} = \tan(\text{angle})$$

where:

H is drive arm member 90,

R is forward arm member 98 from 102 to 110,

Tip is the most inward leading edge of 108, angle is from the slot opening to the tip, h0 is the angle at retraction of 90, r0 is the angle at retraction of 98, tip0 is the angle at retraction of the tip, h1 is the angle at extension of 90, r1 is the angle at extension of 98, and tip1 is the angle at extension of the tip.

In an exemplary preferred embodiment,

H=10 inches,

R=21.25 inches,

Tip=16.196 inches, angle=25 degrees, h0=270 degrees, r0=120 degrees, tip0=155 degrees, Δh=65 degrees, h1=h0−Δh=205 degrees, r1=r0−Δh+120 degrees=175 degrees, and tip1=tip0−Δh=90 degrees.

The above equation is used to calculate the lengths of 90, 98 and 108 from pivot point 110 forward to the leading edge (tip) to achieve a predetermined angle (angle) from the opening in the side of the vehicle at 54 to the leading edge (tip). In this exemplary preferred embodiment, that angle is 25 degrees forward from the perpendicular to the main axis of the vehicle. This equation is also used to calculate the opening in the side of the vehicle to achieve a seamless body when the wings are in the fully retracted position.

Referring to FIG. 8, the vanes 56 include primary vanes 56a–56h and secondary vanes 56i–56j. The innermost primary vane 56a is mechanically coupled to the retractable assembly 84 by a link member 140. The outermost secondary vane 56j is mechanically coupled to the vane support member 80 as shown by a link member 142. The secondary vanes 56i, 56j are connected together by a link member 144.

With respect to the primary vanes 56a–56h, exemplary distances along each vane 56 from the vane support member 80 to the point where its link member 114 is attached (as denoted by the small arcs in FIGS. 10 and 11) are set forth below:

| Vane | Distance (inches) |
|---|---|
| Primary 0 (FIG. 10, 56a) | 4.0000 |
| Primary 1 (FIG. 10, 56b) | 4.6560 |
| Primary 2 (FIG. 10, 56c) | 5.6966 |
| Primary 3 (FIG. 10, 56d) | 7.4138 |
| Primary 4 (FIG. 10, 56e) | 10.5337 |
| Primary 5 (FIG. 10, 56f) | 17.4234 |
| Primary 5a (FIG. 10, 56f) | 4.0000 |
| Primary 6 (FIG. 10, 56g) | 6.8707 |
| Primary 7 (FIG. 10, 56h) | 19.1471 |

FIG. 16 is a perspective view showing how the link members 114 are connected to each other through the vanes 56. Exemplary preferred interconnection hardware for the link members 114 comprises cylindrical shafts 150 positioned across apertures formed in the vanes 56 and bracket members 152 which are bolted to the vanes 56 as shown. The bracket members 152 are secured to the vanes 56 with bolts, screws, rivets, or the like. The link members 114 are formed with complementary, channeled end portions 154 bored or otherwise formed such that two of the link members 114 can be aligned and a cylindrical shaft 150 fitted through the two aligned end portions 154. Preferably, the link members 114 are formed as a frame, or with apertures or indentations, to minimize their weight while retaining structural integrity.

Preferably, the vanes 56 are secured to the vane support structure 80 such that the vanes 56 interfit to an extent determined by the articulating assembly 84.

Referring to FIGS. 12–15, 17 and 18, the shape of the vanes 56 bears directly on how the vanes 56 interfit. Generally, the vanes 56 have a zig-zag cross-section and lay on top of one another to create an upper surface 160 and a lower surface 162 on extension and a compact bundle on retraction. As best shown in FIG. 14, the vanes 56 each include a vertical base portion 164, which is pivotally secured to the vane support member 80 as discussed supra, and an end portion 165 on the opposite end of the vane 56. As best shown in FIG. 17, the vertical base portion 164 includes a top edge 166 and a bottom edge 168 from which the upper surface 160 and the lower surface 162 extend, respectively, in opposite directions. In a preferred embodiment, the vanes 56 each have a thickness that decreases from the base portion 164 toward the end portion 165. Exemplary preferred vanes 65 are also curved in shape with the lower surface 162 being concave and are formed of a light-weight material such as carbon fiber, die-punched aluminum, fabricated fiberglass or the like.

Referring to FIGS. 19–22, a preferred retractable wing assembly 52 also includes a flap 170 which is pivotally secured to an exterior surface 172 of the wing adjacent the base portions 164 of the vanes 56. The exterior surface 172, vane support member 80 and vane expanding member 108 are preferably all part of a common assembly. Near the tip 180 (see FIG. 5 also), the flap 170 is connected with a hinge 182 or other mechanism allowing pivotal movement. The articulating flap 170 automatically extends at low flight conditions operating through a low pressure mechanism.

In slow flight and at a high angle of attack, as in landing, the wing has a tendency to stall. Air cannot flow over the wing smoothly. It breaks up into "dirty" air or turbulence. This dirty air increases drag until eventually the wing does not fly anymore.

According to the present invention, as the air over the top of the wing becomes turbulent, the pressure over the wing decreases and reverses into a vacuum. This vacuum sucks the flap 170 up which creates a slot between the flap 170 and the wing. This slot channels air over the wing smoothly thus allowing the wing to continue to fly.

As shown by way of example in FIGS. 23 and 24, an alternative retractable wing assembly 52' in accordance with a preferred embodiment of another invention may be directly secured to a vehicle. Here, the retractable wing assembly 52' includes a fin support member 80' that is driven about a pivot point by a worm gear 184 or other suitable device. As in the exemplary embodiment shown in FIG. 5, the linking members 114 and 140 are used to drive the vanes 56 between the expanded and retracted positions.

Figure 25:
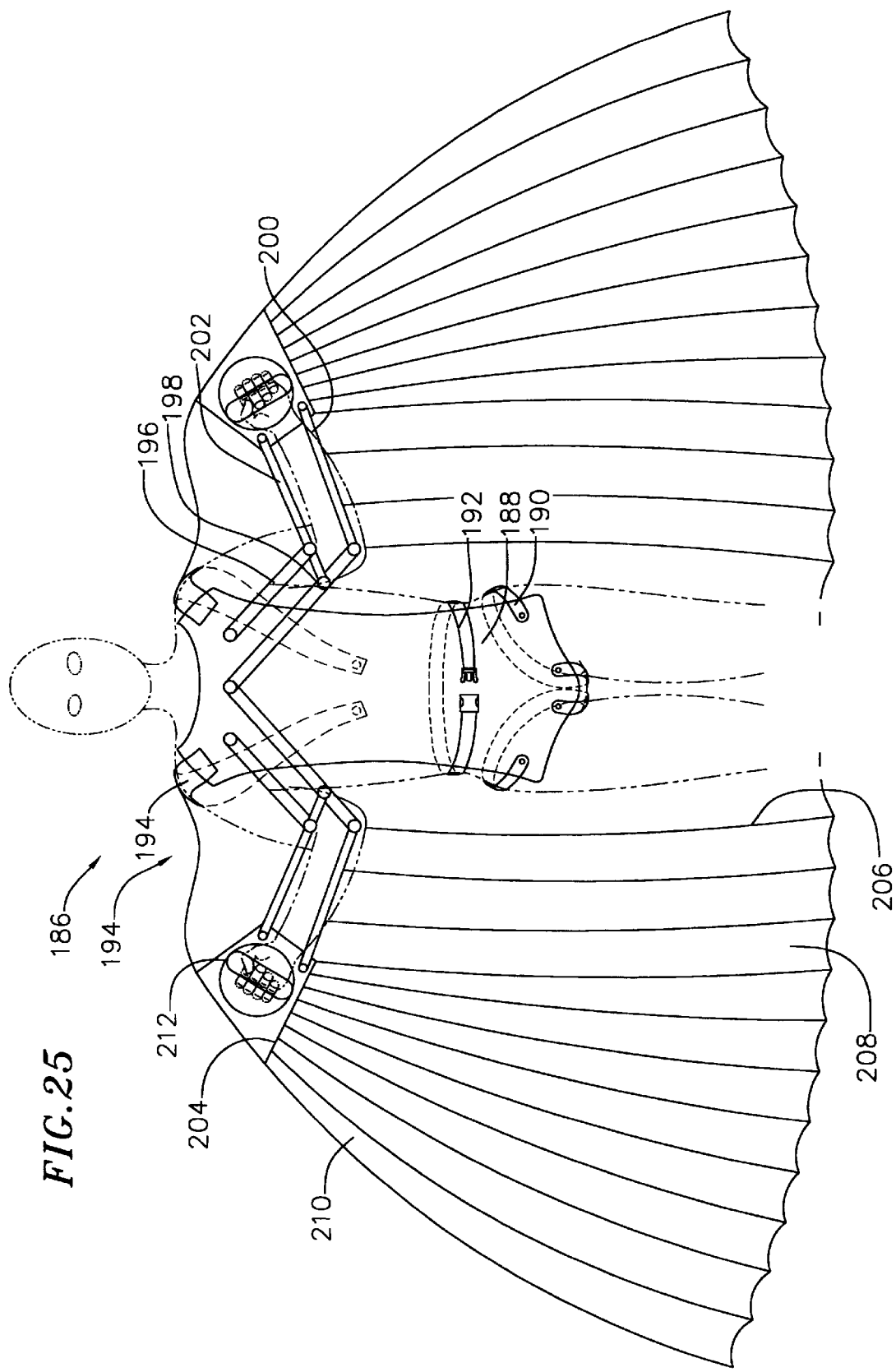
FIG. 25 is a simplified cross-sectional top view of a non-motorized vehicle having a retractable wing assembly.

It should be understood that the descriptive term "vehicle," as used herein, is not limited to motorized vehicles. The inventions herein are also applicable to, for example, non-motorized vehicles including hang-gliders and related flying vehicles. Turning to FIG. 25, an exemplary non-motorized vehicle 186 that is worn by the user includes a vehicle body 188 that is secured to the user's back by leg, waist and shoulder harnesses 190, 192 and 194. In a manner similar to the motorized vehicles described above, the non-motorized vehicle 186 also has two retractable wing assemblies 194 which include arm members 196, 198, 200 and 202, and a fin support member 204 to which fins 206 are pivotably connected. The fins 206 are connected to one another by layers of parachute material 208 respectively located on the top and bottom sides of the wings. As the wings are moved outwardly from the retracted position, a fixed fin 210 will pull on the adjacent fin 206 by way of the parachute material 208, thereby causing the adjacent fin to pivot outwardly. That fin will then pull on the next fin and so on until the wings reach their extended position. The wings are moved are moved to their extended position by human power and, therefore, handles 212 are provided.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

I claim:

1. A flying vehicle with a retractable wing assembly comprising:
    a vehicle body; and
    at least one retractable wing assembly attached to said vehicle body, said wing assembly including:
        a vane support member;
        a plurality of vanes pivotally secured to said vane support member;
        a plurality of link members interconnecting said vanes; and
        an articulating assembly secured to said vehicle body and mechanically coupled to said vane support member and at least one of said vanes, said articulating assembly being manipulable to reposition said vane support member relative to said vehicle body and to spread said vanes apart from each other.

2. The flying vehicle with a retractable wing assembly of claim 1 further comprising:
an actuator mechanically connected between said vehicle body and a portion of said articulating assembly.

3. The flying vehicle with a retractable wing assembly of claim 1 further comprising:
at least one elastic membrane positioned between said vehicle body and said at least one retractable wing assembly.

4. A retractable wing assembly for a flying vehicle comprising:
a vane support member;
a wing including a plurality of vanes, said vanes each including a base portion and an end portion, said vanes being pivotally secured to said vane support member at said base portions; and
a wing extending and retracting assembly including:
a plurality of link members each pivotally connecting two of said vanes between said base portions and said end portions of said vanes; and
an articulating assembly secured to a vehicle body and mechanically coupled to said vane support member and at least one of said vanes, said articulating assembly being manipulable to reposition said vane support member relative to the vehicle body while simultaneously spreading said end portions of said vanes apart from each other.

5. The retractable wing assembly for a flying vehicle of claim 4 wherein:
said vanes are secured to said vane support structure and said link members are sized and connected to said vanes such that said wing can be extended or retracted without having to adjust the link members.

6. The retractable wing assembly for a flying vehicle of claim 4 wherein:
said vanes are secured to said vane support structure and formed such that said vanes interfit to an extent determined by said articulating assembly.

7. The retractable wing assembly for a flying vehicle of claim 4 wherein:
said vanes each include a vertical base portion which is pivotally secured to said vane support member.

8. The retractable wing assembly for a flying vehicle of claim 7 wherein:
said vertical base portion includes a top edge and a bottom edge; and
said vanes each include an upper surface and a lower surface extending from said top edge and said bottom edge, respectively.

9. The retractable wing assembly for a flying vehicle of claim 8 wherein:
said upper surface and said lower surface extend from said vertical base portion in opposite directions.

10. The retractable wing assembly for a flying vehicle of claim 4 wherein:
said vanes each have a thickness that decreases from said base portion toward said end portion.

11. The retractable wing assembly for a flying vehicle of claim 4 wherein:
said vanes are curved.

12. The retractable wing assembly for a flying vehicle of claim 4 wherein:
said vanes each include a concave lower surface.

13. The retractable wing assembly for a flying vehicle of claim 4 further comprising:
a flap pivotally secured to an exterior surface of said wing adjacent said base portions of said vanes.

14. A retractable fin support assembly for a flying vehicle comprising:
a fin support member including a plurality of mechanical couplings for pivotally attaching a plurality of mechanically interconnected fins to said fin support member; and
a retractable assembly mechanically coupling said fin support member to a vehicle body, said retractable assembly being manipulable to translate and rotate said fin support member in relation to the vehicle body between a retracted position and an extended position.

15. The retractable fin support assembly for a flying vehicle of claim 14 wherein:
said fin support member is pivotally attached to said retractable assembly.

16. The retractable fin support assembly for a flying vehicle of claim 14 wherein:
said retractable assembly includes an inner portion and an outer portion which are articulately interconnected.

17. The retractable fin support assembly for a flying vehicle of claim 16 wherein:
said inner portion includes a drive arm member and an extension arm member which are pivotally attached to the vehicle body.

18. The retractable fin support assembly for a flying vehicle of claim 17 wherein:
said outer portion includes a forward arm member and a rearward arm member, said forward arm member being pivotally attached to said drive arm member and said extension arm member, said rearward arm member being pivotally attached to said drive arm member.

19. The retractable fin support assembly for a flying vehicle of claim 16 wherein:
said retractable assembly includes a fin expanding member which is attached to at least one of the fins and pivotally attached to said outer portion.

20. The retractable fin support assembly for a flying vehicle of claim 16 wherein:
said outer portion includes a forward arm member and a rearward arm member; and
said retractable assembly includes a fin expanding member which is pivotally attached to said forward arm member and said rearward arm member and attached to an outermost fin of the plurality of mechanically interconnected fins.

21. A vehicle, comprising:
a vehicle body; and
a retractable wing assembly associated with the vehicle body and including:
a first member having a first portion and a second portion in spaced relation to the first portion, the first portion being pivotably connected to the vehicle body such that the second portion is movable from a retracted position adjacent to the vehicle body to an extended portion in spaced relation to the vehicle body;
a second member having a first portion and a second portion in spaced relation to the first portion, the first portion of the second member being pivotably connected to the second portion of the first member such that the second portion of the second member is movable from a retracted position adjacent to the first portion of the first member to an extended portion in spaced relation to the first portion of the first member; and a third member having a first portion and a second portion in spaced relation to the first portion, the first portion of the third member being operably connected to the second portion of the second member such that the second portion of the third member is movable from a retracted position adjacent to the first portion of the second member to an extended portion in spaced relation to the first portion of the second member.

* * * * *